US011767573B2

(12) United States Patent
Mizutani et al.

(10) Patent No.: US 11,767,573 B2
(45) Date of Patent: Sep. 26, 2023

(54) FERRITIC STAINLESS STEEL SHEET AND METHOD OF PRODUCING SAME, AND AL OR AL ALLOY COATED STAINLESS STEEL SHEET

(71) Applicant: JFE STEEL CORPORATION, Tokyo (JP)

(72) Inventors: Akito Mizutani, Tokyo (JP); Rinta Sato, Tokyo (JP); Mitsuyuki Fujisawa, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 17/275,051

(22) PCT Filed: Aug. 26, 2019

(86) PCT No.: PCT/JP2019/033353
§ 371 (c)(1),
(2) Date: Mar. 10, 2021

(87) PCT Pub. No.: WO2020/054384
PCT Pub. Date: Mar. 19, 2020

(65) Prior Publication Data
US 2022/0056547 A1    Feb. 24, 2022

(30) Foreign Application Priority Data
Sep. 13, 2018    (JP) .................. 2018-171805

(51) Int. Cl.
*C21D 9/46*    (2006.01)
*C21D 6/00*    (2006.01)
*C22C 38/00*    (2006.01)
*C22C 38/02*    (2006.01)
*C22C 38/04*    (2006.01)
*C22C 38/06*    (2006.01)
*C21D 1/02*    (2006.01)
*C23C 2/12*    (2006.01)

(52) U.S. Cl.
CPC ............. *C21D 9/46* (2013.01); *C21D 1/02* (2013.01); *C21D 6/004* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C23C 2/12* (2013.01); *C21D 2211/005* (2013.01)

(58) Field of Classification Search
CPC ...... C21D 1/26; C21D 1/76; C21D 2211/005; C21D 6/002; C21D 6/004; C21D 8/0257; C21D 8/0278; C21D 9/46; C23C 2/12
See application file for complete search history.

(56) References Cited

U.S. PATENT DOCUMENTS

| | | | |
|---|---|---|---|
| 4,870,046 A | 9/1989 | Yamanaka et al. | |
| 5,866,065 A | 2/1999 | Herbelin et al. | |
| 5,981,089 A | 11/1999 | Imai et al. | |
| 6,296,953 B1* | 10/2001 | Linden | B32B 15/011 428/685 |
| 6,773,660 B2 | 8/2004 | Cedergren et al. | |
| 6,905,651 B2 | 6/2005 | Johansson et al. | |
| 7,601,672 B2 | 10/2009 | Tooru et al. | |
| 10,975,459 B2 | 4/2021 | Nakamura et al. | |
| 2009/0022636 A1* | 1/2009 | Inaguma | C22C 38/06 148/531 |
| 2009/0274929 A1 | 11/2009 | Sakamoto et al. | |
| 2017/0029916 A1* | 2/2017 | Mizutani | C21D 6/002 |

FOREIGN PATENT DOCUMENTS

| | | |
|---|---|---|
| CN | 1147562 A | 4/1997 |
| CN | 1156764 A | 8/1997 |
| CN | 1261409 A | 7/2000 |
| CN | 1599803 A | 3/2005 |
| CN | 101213323 A | 7/2008 |
| CN | 108026623 A | 5/2018 |
| EP | 0035369 A1 | 9/1981 |
| EP | 0370645 A1 | 5/1990 |
| EP | 3130688 A1 | 2/2017 |
| GB | 0370645 * | 1/1989 |
| JP | S63266044 A | 11/1988 |
| JP | H02133563 A | 5/1990 |
| JP | H04350148 A | 12/1992 |
| JP | 0688882 * | 12/1994 |
| JP | 0688882 * | 12/1995 |
| JP | H08209308 A | 8/1996 |
| JP | 2002507249 A | 3/2002 |
| JP | 2004169110 A | 6/2004 |

(Continued)

OTHER PUBLICATIONS

Nov. 8, 2021, the Extended European Search Report issued by the European Patent Office in the corresponding European Patent Application No. 19859555.5.
Aug. 31, 2021, Office Action issued by the China National Intellectual Property Administration in the corresponding Chinese Patent Application No. 201980060058.6 with English language search report.
Aug. 19, 2021, the Partial Supplementary European Search Report issued by the European Patent Office in the corresponding European Patent Application No. 19859555.5.
Nov. 19, 2019, International Search Report issued in the International Patent Application No. PCT/JP2019/033353.

(Continued)

*Primary Examiner* — Nicholas A Wang
(74) *Attorney, Agent, or Firm* — KENJA IP LAW PC

(57) ABSTRACT

A ferritic stainless steel sheet comprises a chemical composition containing, in mass %, C: 0.030% or less, Si: 3.0% or less, Mn: 1.0% or less, P: 0.040% or less, S: 0.010% or less, Cr: 11.0% to 30.0%, Al: 8.0% to 20.0%, Ni: 0.05% to 0.50%, N: 0.020% or less, and at least one selected from the group consisting of Zr: 0.01% to 0.20% and Hf: 0.01% to 0.20%, with a balance consisting of Fe and inevitable impurities.

8 Claims, No Drawings

(56) References Cited

FOREIGN PATENT DOCUMENTS

| JP | 2005298912 A |   | 10/2005 |
|----|--------------|---|---------|
| JP | 2013079428 A |   | 5/2013  |
| JP | 2013079428 A | * | 5/2013  |
| KR | 790001062    | * | 8/1979  |

OTHER PUBLICATIONS

Oct. 10, 2022, Office Action issued by the Korean Intellectual Property Office in the corresponding Korean Patent pplication No. 10-2021-7007620 with English language concise statement of relevance.

May 23, 2023, Notification of Reasons for Refusal issued by the Japan Patent Office in the corresponding Japanese atent Application No. 2020-001594 with English language concise statement of relevance.

* cited by examiner

FERRITIC STAINLESS STEEL SHEET AND METHOD OF PRODUCING SAME, AND AL OR AL ALLOY COATED STAINLESS STEEL SHEET

TECHNICAL FIELD

The present disclosure relates to a ferritic stainless steel sheet that has excellent electrical resistivity and oxidation resistance and, even in the case where its thickness is thin, has little deformation such as warpage or distortion, and an Al or Al alloy coated stainless steel sheet as a material for producing the ferritic stainless steel sheet.

BACKGROUND

Resistance heating is a method of heating an object by Joule heat generated when passing a current through a resistance heating element. This method has high efficiency of conversion from electrical energy to thermal energy and can be carried out by a simple control unit, and thus is used in a wide range of fields such as industrial electric heating furnaces and electric heating cookers.

Resistance heating elements used in resistance heating can be divided into metallic heating elements such as Ni—Cr alloys and Fe—Cr alloys and non-metallic heating elements such as SiC. Of these, metallic heating elements have better workability than non-metallic heating elements, and accordingly can be worked into foil materials or wire rods. Thus, metallic heating elements can be used in thin members such as window glasses and floors, and members subjected to bending load such as gloves.

As such metallic heating elements, for example, JIS C 2520 defines three types of Ni—Cr alloys (nickel-chromium wires and rolled wires for electrical heating, type 1 to type 3) and two types of Fe—Cr alloys (iron-chromium wires and rolled wires for electrical heating, type 1 to type 2) as alloy wires for electrical heating and alloy rolled wires for electrical heating. Ni—Cr alloys are Ni-based alloys whose main additive elements are Cr: 15% to 21% and Si: 0.75% to 3%, and Fe—Cr alloys are Fe-based alloys whose main additive elements are Cr: 17% to 26%, Al: 2% to 6%, and Si: 1.5% or less (where "%" used in relation to each element is mass %, the same applying hereafter).

Of these, Fe—Cr alloys, in particular stainless steel sheets having high Al content (hereafter also referred to as "Al-containing stainless steel sheets"), have excellent oxidation resistance at high temperature and are less expensive than Ni—Cr alloys, and therefore are widely used as resistance heating elements.

As techniques relating to such Al-containing stainless steel sheets, for example, JP H2-133563 A (PTL 1) discloses "a high Al-containing stainless steel sheet production method comprising overlapping an Al sheet on at least one side of a stainless steel sheet containing C≤0.03%, Cr≤30%, and one or more of Ti, Nb, V, and Mo in an amount of 0.01% to 0.8% so as to achieve a proportion corresponding to the amount of Al to be contained, passing them between rolls to obtain a pressure bonded laminated sheet, and subjecting the obtained pressure bonded laminated sheet to a diffusion treatment at a temperature in a range of 600° C. to 1300° C. under the conditions that the Al layer is alloyed without melting".

JP 2004-169110 A (PTL 2) discloses "a Fe—Cr—Al-based stainless steel sheet containing, in mass %, Cr: 10% or more and 30% or less, Al: more than 6.5% and 15% or less, one or both of Ti: 0.02% or more and 0.1% or less and Nb: 0.02% or more and 0.3% or less, La: 0.01% or more and 0.1% or less, Ce: 0.01% or more and 0.1% or less, and P: 0.01% or more and 0.05% or less".

CITATION LIST

Patent Literature

PTL 1: JP H2-133563 A
PTL 2: JP 2004-169110 A

SUMMARY

Technical Problem

Al-containing stainless steel has high electrical resistivity by Al. However, Al is an element that decreases the toughness of the steel, and a higher Al content increases the possibility of cracking in hot rolling or cold rolling.

It is therefore difficult to produce a stainless steel sheet having an Al content of 6.5% or more by a typical casting and rolling method.

In view of this, with the technique described in PTL 1, a pressure bonded laminated sheet is prepared by overlapping an Al sheet on at least one side of a stainless steel sheet as a base steel sheet, and the pressure bonded laminated sheet is subjected to a predetermined heat treatment (hereafter also referred to as "diffusion heat treatment") to diffuse Al into the stainless steel sheet, thus increasing the Al content of the stainless steel sheet as a finished product.

With the technique described in PTL 2, a multilayer sheet is prepared by coating the surface of a stainless steel sheet as a base steel sheet with Al or an Al alloy, and the multilayer sheet is subjected to a predetermined diffusion heat treatment (diffusion annealing) to diffuse Al into the stainless steel sheet, thus increasing the Al content of the stainless steel sheet as a finished product.

However, the techniques described in PTL 1 and PTL 2 have a problem in that deformation such as warpage or distortion tends to occur in the steel sheet in the diffusion heat treatment, particularly in the case where the steel sheet is thin. The steel sheet obtained as a result of the diffusion heat treatment has a large amount of Al dissolved therein, and accordingly has considerably increased strength. If deformation such as warpage or distortion occurs in such a steel sheet in the diffusion heat treatment, it is difficult to adjust the steel sheet to the original shape. In the case of performing the diffusion heat treatment on the pressure bonded laminated sheet or the multilayer sheet after working the sheet into a predetermined part shape, too, the problem that deformation occurs in the diffusion heat treatment and the resultant part is deformed arises.

It could therefore be helpful to provide a ferritic stainless steel sheet that has excellent electrical resistivity and oxidation resistance and, even in the case where its thickness is thin, has little deformation such as warpage or distortion, together with an advantageous method of producing the same.

It could also be helpful to provide an Al or Al alloy coated stainless steel sheet as a material for producing the ferritic stainless steel sheet.

Solution to Problem

We conducted various studies to solve the problems stated above. First, we repeatedly examined and studied why deformation such as warpage or distortion occurs when performing the diffusion heat treatment on the pressure bonded laminated sheet or the multilayer sheet having the Al sheet or the Al or Al alloy coating layer on the surface of the base steel sheet (stainless steel sheet).

As a result, we found out that the deformation is caused by the change in density when Al diffuses into the base steel sheet.

In detail, when Al diffuses and dissolves into the stainless steel sheet, the density of the stainless steel sheet decreases, and the volume of the stainless steel sheet tends to increase. In the process of the diffusion heat treatment, the Al content in the surface layer becomes higher than the Al content in the center part in the base steel sheet, and the base steel sheet varies in density in the thickness direction. Moreover, if the Al coating weight on the surface of the base steel sheet is not uniform, the density varies in the in-plane direction of the surface of the base steel sheet. This causes stress in the steel sheet. Since stainless steel sheets and in particular ferritic stainless steel sheets do not have very high strength at high temperature, the steel sheet cannot withstand the stress and undergoes deformation such as warpage or distortion.

Based on these findings, we conducted further studies to suppress deformation such as warpage or distortion in the diffusion heat treatment.

We consequently discovered that, by appropriately adjusting the chemical composition of a ferritic stainless steel sheet as a base steel sheet, specifically, by increasing the Al content to a range of 2.5 mass % to 6.5 mass % and containing at least one selected from the group consisting of Zr and Hf in an appropriate amount, and forming a predetermined Al or Al alloy coated layer on the surface of the base substrate and performing a diffusion heat treatment, it is possible to obtain a ferritic stainless steel sheet that has excellent electrical resistivity and oxidation resistance and, even in the case where its thickness is thin, has little deformation such as warpage or distortion.

In detail, we discovered the following:

(1) To suppress deformation such as warpage or distortion in the process of the diffusion heat treatment, the amount of Al contained beforehand in the ferritic stainless steel sheet as the base steel sheet and the amount of Al diffused into the base steel sheet in the diffusion heat treatment are appropriately adjusted.

Specifically, by increasing the amount of Al contained beforehand in the ferritic stainless steel sheet as the base steel sheet to a range of 2.5 mass % to 6.5 mass %, the non-uniformity of the density of the stainless steel sheet which occurs in the diffusion heat treatment can be effectively suppressed as much as possible.

(2) However, while it is advantageous to form the Al-containing layer on the surface of the base steel sheet by Al or Al alloy coating, if the amount of Al contained beforehand in the ferritic stainless steel sheet as the base steel sheet is 2.5 mass % to 6.5 mass %, the coatability of the Al or Al alloy coating decreases.

(3) In detail, since Al or Al alloy coating is performed by immersing the base steel sheet as a coating substrate (hereafter also simply referred to as "coating substrate") in molten Al or Al alloy, it is necessary to, before the immersion of the coating substrate, increase the sheet temperature of the coating substrate to about 650° C. to 750° C. which is approximately equal to the temperature of the molten Al or Al alloy.

(4) However, if the Al content in the coating substrate is 2.5 mass % or more, an $Al_2O_3$ layer forms on the surface of the coating substrate during the foregoing temperature increase, as a result of which the coatability of the Al or Al alloy coating decreases and a non-coating part emerges.

This makes it difficult to diffuse a sufficient amount of Al while suppressing deformation such as warpage or distortion in the diffusion heat treatment.

(5) The formation of the $Al_2O_3$ layer on the surface of the coating substrate during the temperature increase is, however, suppressed by containing, in the coating substrate, at least one selected from the group consisting of Zr and Hf in an appropriate amount.

As a result, the coatability of the Al or Al alloy coating is improved, and deformation such as warpage or distortion in the process of the diffusion heat treatment caused by the presence of the non-coating part is suppressed.

(6) Therefore, by increasing the Al content in the ferritic stainless steel sheet as the coating substrate to a range of 2.5 mass % to 6.5 mass % and containing, in the coating substrate, at least one selected from the group consisting of Zr and Hf in an appropriate amount and then forming a predetermined amount of Al or Al alloy coated layer on the surface of the coating substrate and performing the diffusion heat treatment, it is possible to obtain a ferritic stainless steel sheet that has an Al content of 8.0 mass % or more, has excellent electrical resistivity and oxidation resistance, and, even in the case where its thickness is thin, has little deformation such as warpage or distortion.

The present disclosure is based on these discoveries and further studies.

We thus provide:

1. A ferritic stainless steel sheet comprising a chemical composition containing (consisting of), in mass %, C: 0.030% or less, Si: 3.0% or less, Mn: 1.0% or less, P: 0.040% or less, S: 0.010% or less, Cr: 11.0% to 30.0%, Al: 8.0% to 20.0%, Ni: 0.05% to 0.50%, N: 0.020% or less, and at least one selected from the group consisting of Zr: 0.01% to 0.20% and Hf: 0.01% to 0.20%, with a balance consisting of Fe and inevitable impurities.

2. The ferritic stainless steel sheet according to 1., wherein the chemical composition further contains, in mass %, one or more selected from the group consisting of REM: 0.01% to 0.20%, Cu: 0.01% to 0.10%, Ti: 0.01% to 0.50%, Nb: 0.01% to 0.50%, V: 0.01% to 0.50%, Mo: 0.01% to 6.0%, W: 0.01% to 6.0%, B: 0.0001% to 0.0050%, Ca: 0.0002% to 0.0100%, and Mg: 0.0002% to 0.0100%.

3. An Al or Al alloy coated stainless steel sheet comprising: a coating substrate; and an Al or Al alloy coated layer on a surface of the coating substrate, wherein the coating substrate is a ferritic stainless steel sheet having a chemical composition containing, in mass %, C: 0.030% or less, Si: 1.0% or less, Mn: 1.0% or less, P: 0.040% or less, S: 0.010% or less, Cr: 11.0% to 30.0%, Al: 2.5% to 6.5%, Ni: 0.05% to 0.50%, N: 0.020% or less, and at least one selected from the group consisting of Zr: 0.01% to 0.20% and Hf: 0.01% to 0.20%, with a balance consisting of Fe and inevitable impurities, and a thickness and an Al content of the coating substrate and a thickness of the Al or Al alloy coated layer satisfy a relationship in the following expression (1):

$$8.0 \leq C_{Al} + 30 \times t/T \leq 20.0 \qquad (1)$$

where $C_{Al}$ is the Al content of the coating substrate in mass %, T is the thickness of the coating substrate in μm, and t is the thickness of the Al or Al alloy coated layer in μm, and, in the case where the Al or Al alloy coated layer is present on each of both sides of the coating substrate, is a total thickness of Al or Al alloy coated layers on the both sides of the coating substrate.

4. The Al or Al alloy coated stainless steel sheet according to 3., wherein the chemical composition of the coating substrate further contains, in mass %, one or more selected from the group consisting of REM: 0.01% to 0.20%, Cu: 0.01% to 0.10%, Ti: 0.01% to 0.50%, Nb: 0.01% to 0.50%, V: 0.01% to 0.50%, Mo: 0.01% to 6.0%, W: 0.01% to 6.0%, B: 0.0001% to 0.0050%, Ca: 0.0002% to 0.0100%, and Mg: 0.0002% to 0.0100%.

5. A method of producing the ferritic stainless steel sheet according to 1. or 2., the method comprising subjecting the Al or Al alloy coated stainless steel sheet according to 3. or 4. to a heat treatment of holding in a temperature range of 600° C. to 1300° C. for 1 minute or more.

Advantageous Effect

It is thus possible to obtain a ferritic stainless steel sheet that has excellent electrical resistivity and oxidation resistance and, even in the case where its thickness is thin, has little deformation such as warpage or distortion.

The ferritic stainless steel sheet has excellent oxidation resistance particularly at high temperature, and therefore is suitable for use in a heating element of an exhaust gas heater installed immediately upstream of an exhaust gas purifier in a vehicle and the like, a heating element of an electric heating furnace or an electric heating cooker, a catalyst support, a stove reflector, a chimney member, etc.

DETAILED DESCRIPTION

One of the disclosed embodiments will be described below.

First, the chemical composition of a ferritic stainless steel sheet according to one of the disclosed embodiments will be described below. While the unit of the content of each element in the chemical composition is "mass %", the content is expressed simply in "%" unless otherwise specified.

C: 0.030% or Less

If the C content is more than 0.030%, the toughness of the steel sheet decreases, making it difficult to produce a coating substrate of an Al or Al alloy coated stainless steel sheet (hereafter also simply referred to as "coating substrate"). Herein, the Al or Al alloy coated stainless steel sheet is a material for producing the ferritic stainless steel sheet according to one of the disclosed embodiments. The C content is therefore 0.030% or less. The C content is preferably 0.020% or less, and more preferably 0.010% or less. No lower limit is placed on the C content. However, since excessive decarburization leads to increased costs, the lower limit is preferably 0.002%.

Si: 3.0% or Less

Si has a function of increasing the electrical resistivity of the ferritic stainless steel sheet, and its electrical resistivity improving effect per mass % is approximately equal to that of Al. From the viewpoint of achieving this effect, the Si content is preferably 0.01% or more. The Si content is more preferably 0.10% or more. If the Si content is more than 3.0%, the steel hardens excessively, making it difficult to work the steel sheet into a predetermined part shape. The Si content is therefore 3.0% or less. The Si content is preferably 2.0% or less.

Mn: 1.0% or Less

If the Mn content is more than 1.0%, the oxidation resistance of the steel decreases. The Mn content is therefore 1.0% or less. The Mn content is preferably 0.5% or less, and more preferably 0.15% or less. If the Mn content is less than 0.01%, refining is difficult. Accordingly, the Mn content is preferably 0.01% or more.

P: 0.040% or Less

If the P content is more than 0.040%, the toughness and ductility of the steel decrease, making the production of the coating substrate difficult. The P content is therefore 0.040% or less. The P content is preferably 0.030% or less. No lower limit is placed on the P content. However, since excessive dephosphorization leads to increased costs, the lower limit is preferably 0.010%.

S: 0.010% or Less

If the S content is more than 0.010%, the hot workability decreases, making the production of the coating substrate difficult. The S content is therefore 0.010% or less. The S content is preferably 0.004% or less, and more preferably 0.002% or less. No lower limit is placed on the S content. However, since excessive desulfurization leads to increased costs, the lower limit is preferably 0.0005%.

Cr: 11.0% to 30.0%

Cr is an element necessary to ensure the oxidation resistance at high temperature. Cr also has a function of increasing the electrical resistivity, though to a less extent than Al and Si. If the Cr content is less than 11.0%, the oxidation resistance at high temperature cannot be ensured sufficiently. If the Cr content is more than 30.0%, the toughness of the slab or the hot-rolled steel sheet in the production process decreases, making the production of the coating substrate difficult. The Cr content is therefore 11.0% to 30.0%. The Cr content is preferably 15.0% or more, and more preferably 18.0% or more. The Cr content is preferably 26.0% or less, and more preferably 22.0% or less.

Al: 8.0% to 20.0%

Al has an effect of increasing the electrical resistivity. Al also has an effect of improving the oxidation resistance by forming an oxidation layer mainly composed of $Al_2O_3$ at high temperature when the steel sheet is used as a resistance heating element. To achieve desired high electrical resistivity, the Al content needs to be 8.0% or more. If the Al content is more than 20.0%, the steel becomes brittle, making it difficult to work the steel sheet into the predetermined part shape. The Al content is therefore 8.0% to 20.0%. The Al content is preferably 9.0% or more. The Al content is preferably 15.0% or less.

Ni: 0.05% to 0.50%

Ni has an effect of improving the brazing property when producing a resistance heating element. From the viewpoint of achieving this effect, the Ni content is 0.05% or more. Meanwhile, Ni is an element that stabilizes austenite microstructure. Accordingly, if the Ni content is high, particularly if the Ni content is more than 0.50%, austenite microstructure tends to form when the steel sheet is used as a resistance heating element. In detail, during use as a resistance heating element, if oxidation at high temperature progresses and Al in the steel is exhausted, austenite microstructure tends to form. In the case where austenite microstructure forms, the coefficient of thermal (heat) expansion of the part changes, which results in problems such as a fracture of the part. The Ni content is therefore 0.50% or less. The Ni content is preferably 0.20% or less.

N: 0.020% or Less

If the N content is more than 0.020%, the toughness decreases, making the production of the coating substrate difficult. The N content is therefore 0.020% or less. The N content is preferably 0.010% or less. No lower limit is placed on the N content. However, since excessive denitrification leads to increased costs, the lower limit is preferably 0.002%.

At least one selected from the group consisting of Zr: 0.01% to 0.20% and Hf: 0.01% to 0.20%

Zr and Hf each have an effect of improving the coatability of the Al or Al alloy coating (hereafter also simply referred to as "coatability"). As mentioned earlier, since Al or Al alloy coating is performed by immersing the coating substrate in molten Al or Al alloy, it is necessary to, before the immersion of the coating substrate, increase the sheet temperature of the coating substrate to about 650° C. to 750° C. which is approximately equal to the temperature of the molten Al or Al alloy. In the case where the coating substrate contains a large amount of Al, however, an $Al_2O_3$ layer forms on the surface of the coating substrate during this temperature increase, as a result of which the coatability decreases. Zr and Hf each have an effect of improving the coatability by decreasing the growth rate of the $Al_2O_3$ layer during the temperature increase even in the case where the coating substrate contains a large amount of Al. From the viewpoint of achieving this effect, the Zr content and the Hf content are each 0.01% or more. If the Zr content and the Hf content are each more than 0.20%, the element forms an intermetallic compound with Fe or the like and causes a decrease in toughness.

Accordingly, the content of each of Zr and Hf is preferably 0.01% to 0.20%. The content is preferably 0.02% or more. The content is preferably 0.15% or less.

One of Zr and Hf may be contained, or both Zr and Hf may be contained. In the case of containing both Zr and Hf, the total content of Zr and Hf is preferably 0.20% or less.

While the basic components have been described above, the chemical composition may optionally further contain, in addition to the foregoing basic components, one or more selected from the group consisting of REM: 0.01% to 0.20%, Cu: 0.01% to 0.10%, Ti: 0.01% to 0.50%, Nb: 0.01% to 0.50%, V: 0.01% to 0.50%, Mo: 0.01% to 6.0%, W: 0.01% to 6.0%, B: 0.0001% to 0.0050%, Ca: 0.0002% to 0.0100%, and Mg: 0.0002% to 0.0100%.

REM: 0.01% to 0.20%

REM refers to Sc, Y, and lanthanoid-based elements (elements of atomic numbers 57 to 71 such as La, Ce, Pr, Nd, and Sm). REM has an effect of improving the adhesion property of an $Al_2O_3$ layer that forms at high temperature when the steel sheet is used as a resistance heating element and improving the exfoliation resistance of the $Al_2O_3$ layer in an environment in which oxidation repeatedly occurs. This effect is achieved if the REM content (the total content of Sc, Y, and lanthanoid-based elements) is 0.01% or more. If the REM content is more than 0.20%, the hot workability decreases, making the production of the coating substrate difficult. Accordingly, in the case of containing REM, the REM content is 0.01% to 0.20%. The REM content is more preferably 0.03% or more. The REM content is more preferably 0.10% or less.

As REM, one element from among Sc, Y, and lanthanoid-based elements may be contained, or two or more elements from among Sc, Y, and lanthanoid-based elements may be contained together.

Cu: 0.01% to 0.10%

Cu has an effect of precipitating into the steel and improving the high-temperature strength, and accordingly may be optionally contained in an amount of 0.01% or more. If the Cu content is more than 0.10%, the toughness of the steel decreases. Accordingly, in the case of containing Cu, the Cu content is 0.01% to 0.10%. The Cu content is more preferably 0.05% or less, and further preferably 0.03% or less.

Ti: 0.01% to 0.50%

Ti has an effect of combining with C or N in the steel and improving the toughness and an effect of improving the oxidation resistance, and accordingly may be optionally contained in an amount of 0.01% or more. If the Ti content is more than 0.50%, a large amount of Ti oxide mixes into the $Al_2O_3$ layer which forms at high temperature when the steel sheet is used as a resistance heating element, as a result of which the oxidation resistance at high temperature decreases. Accordingly, in the case of containing Ti, the Ti content is 0.01% to 0.50%. The Ti content is more preferably 0.05% or more. The Ti content is more preferably 0.20% or less.

Nb: 0.01% to 0.50%

Nb has an effect of combining with C or N in the steel and improving the toughness, and accordingly may be optionally contained in an amount of 0.01% or more. If the Nb content is more than 0.50%, a large amount of Nb oxide mixes into the $Al_2O_3$ layer which forms at high temperature when the steel sheet is used as a resistance heating element, as a result of which the oxidation resistance at high temperature decreases. Accordingly, in the case of containing Nb, the Nb content is 0.01% to 0.50%. The Nb content is more preferably 0.05% or more. The Nb content is more preferably 0.20% or less.

V: 0.01% to 0.50%

V has an effect of combining with C or N in the steel and improving the toughness, and accordingly may be optionally contained in an amount of 0.01% or more. If the V content is more than 0.50%, a large amount of V oxide mixes into the $Al_2O_3$ layer which forms at high temperature when the steel sheet is used as a resistance heating element, as a result of which the oxidation resistance at high temperature decreases. Accordingly, in the case of containing V, the V content is 0.01% to 0.50%. The V content is more preferably 0.05% or more. The V content is more preferably 0.20% or less.

Mo: 0.01% to 6.0%

Mo increases the strength at high temperature and contributes to longer life when the ferritic stainless steel sheet is used as a resistance heating element. Mo also has an effect of, by increasing the strength at high temperature, suppressing deformation such as warpage or distortion in the ferritic stainless steel sheet in the diffusion heat treatment. These effects are achieved if the Mo content is 0.01% or more. If the Mo content is more than 6.0%, the workability decreases. Accordingly, in the case of containing Mo, the Mo content is 0.01% to 6.0%. The Mo content is more preferably 1.0% or more. The Mo content is more preferably 5.0% or less.

W: 0.01% to 6.0%

W increases the strength at high temperature and contributes to longer life when the ferritic stainless steel sheet is used as a resistance heating element. W also has an effect of, by increasing the strength at high temperature, suppressing deformation such as warpage or distortion in the ferritic stainless steel sheet in the diffusion heat treatment. These effects are achieved if the W content is 0.01% or more. If the W content is more than 6.0%, the workability decreases. Accordingly, in the case of containing W, the W content is 0.01% to 6.0%. The W content is more preferably 1.0% or more. The W content is more preferably 5.0% or less.

In the case of containing both Mo and W, the total content of Mo and W is preferably 6.0% or less, from the viewpoint of preventing a decrease in workability.

B: 0.0001% to 0.0050%

B has an effect of strengthening the grain boundaries of the steel and preventing cracking in hot rolling in the production process of the coating substrate. This effect is achieved if the B content is 0.0001% or more. If the B content is more than 0.0050%, the oxidation resistance decreases. Accordingly, in the case of containing B, the B content is 0.0001% to 0.0050%. The B content is more preferably 0.0010% or more. The B content is more preferably 0.0040% or less.

Ca: 0.0002% to 0.0100%, Mg: 0.0002% to 0.0100%

An appropriate amount of Ca or Mg has an effect of improving the oxidation resistance by improving the property of adhesion of the $Al_2O_3$ layer, which is formed when the steel sheet is used as a resistance heating element, to the steel and decreasing the growth rate of the $Al_2O_3$ layer. This effect is achieved if the Ca content is 0.0002% or more and if the Mg content is 0.0002% or more. More preferably, the Ca content is 0.0005% or more, and the Mg content is 0.0015% or more. Further preferably, the Ca content is 0.0010% or more. If these elements are contained excessively, the toughness and the oxidation resistance decrease. Accordingly, in the case of containing Ca and Mg, the Ca content and the Mg content are each 0.0100% or less. The Ca content and the Mg content are each more preferably 0.0050% or less.

The components other than those described above are Fe and inevitable impurities.

The thickness of the ferritic stainless steel sheet according to one of the disclosed embodiments is not limited. In the case of using the ferritic stainless steel sheet in a heating element of, for example, an electric heating cooker or an exhaust gas heater installed immediately upstream of an exhaust gas purifier, the thickness of the ferritic stainless steel sheet is preferably 200 µm or less, in order to reduce the cross-sectional area and increase the surface area. The lower limit is preferably 20 µm or more, in order to ensure the strength.

An Al or Al alloy coated stainless steel sheet as a material for producing the foregoing ferritic stainless steel sheet will be described below.

First, a coating substrate of the Al or Al alloy coated stainless steel sheet will be described below.

The coating substrate of the Al or Al alloy coated stainless steel sheet is a ferritic stainless steel sheet comprising a chemical composition containing, in mass %, C: 0.030% or less, Si: 1.0% or less, Mn: 1.0% or less, P: 0.040% or less, S: 0.010% or less, Cr: 11.0% to 30.0%, Al: 2.5% to 6.5%, Ni: 0.05% to 0.50%, N: 0.020% or less, and at least one selected from the group consisting of Zr: 0.01% to 0.20% and Hf: 0.01% to 0.20%, and optionally containing, in mass %, one or more selected from the group consisting of REM: 0.01% to 0.20%, Cu: 0.01% to 0.10%, Ti: 0.01% to 0.50%, Nb: 0.01% to 0.50%, V: 0.01% to 0.50%, Mo: 0.01% to 6.0%, W: 0.01% to 6.0%, B: 0.0001% to 0.0050%, Ca: 0.0002% to 0.0100%, and Mg: 0.0002% to 0.0100%, with the balance consisting of Fe and inevitable impurities.

The chemical composition of the coating substrate of the Al or Al alloy coated stainless steel sheet will be described below. While the unit of the content of each element in the chemical composition is "mass %", the content is expressed simply in "%" unless otherwise specified. In the chemical composition of the coating substrate of the Al or Al alloy coated stainless steel sheet, the contents of the elements other than Si and Al can be the same as those in the foregoing ferritic stainless steel sheet according to one of the disclosed embodiments, and accordingly their description is omitted.

Si: 1.0% or Less

Si has a function of increasing the electrical resistivity of the ferritic stainless steel sheet, and its electrical resistivity improving effect per mass % is approximately equal to that of Al. From the viewpoint of achieving this effect, the Si content is preferably 0.01% or more. If the Si content is more than 1.0%, the toughness decreases, making the production of the coating substrate difficult. The Si content in the coating substrate of the Al or Al alloy coated stainless steel sheet is therefore 1.0% or less. The Si content is preferably 0.5% or less.

Al: 2.5% to 6.5%

If the Al content in the coating substrate is more than 6.5%, the toughness of the steel decreases, making the production of the coating substrate difficult. If the Al content in the coating substrate is less than 2.5%, a larger amount of Al needs to be diffused into the coating substrate from the Al or Al alloy coating provided on the surface of the coating substrate by the diffusion heat treatment, in order to increase the Al content in the ferritic stainless steel sheet as a finished product to 8.0% or more. If the amount of Al diffused increases, however, the change in density of the ferritic stainless steel sheet as the coating substrate increases. This causes deformation such as warpage or distortion. If the Al content in the coating substrate is 2.5% or more, the density of the coating substrate itself before the Al diffusion decreases, so that the non-uniformity of density which occurs in the diffusion heat treatment is reduced. This is effective in suppressing deformation such as warpage or distortion. Therefore, the Al content in the coating substrate of the Al or Al alloy coated stainless steel sheet needs to be 2.5% to 6.5%. The Al content is preferably 4.0% or more, and more preferably 5.0% or more. The Al content is preferably 6.0% or less.

The thickness of the coating substrate of the Al or Al alloy coated stainless steel sheet according to one of the disclosed embodiments is not limited. However, if the coating substrate is thick, the coated layer needs to be thick, and the productivity in the coating treatment decreases. Accordingly, the thickness of the coating substrate is preferably 1.0 mm or less. The lower limit is preferably 30 µm, in order to ensure the strength in the coating treatment.

Particularly in the case of performing the below-described additional rolling after the Al coating treatment, the thickness of the coating substrate of the Al or Al alloy coated stainless steel sheet according to one of the disclosed embodiments is preferably 200 µm to 1.0 mm. The thickness is more preferably 200 µm to 500 µm.

In the case of not performing the below-described additional rolling, the thickness of the coating substrate of the Al or Al alloy coated stainless steel sheet according to one of the disclosed embodiments is preferably 20 µm to 200 µm. The thickness is more preferably 150 µm or less, and further preferably 100 µm or less. The thickness is more preferably 30 µm or more.

The Al or Al alloy coated layer provided on the surface of the coating substrate of the Al or Al alloy coated stainless steel sheet will be described below.

The Al or Al alloy coated layer is a coated layer formed by Al coating or Al—Si alloy coating.

The chemical composition of the Al coating (molten bath) contains Al and inevitable impurities. The chemical composition of the Al—Si alloy coating (molten bath) contains Al, 15.0 mass % or less Si, and inevitable impurities.

Si contained in the Al—Si alloy coating (molten bath) has an effect of suppressing the formation of Fe—Al-based intermetallic compound phase at the interface between the Al or Al alloy coated layer and the coating substrate during the coating treatment and improving the exfoliation resistance and workability of the Al or Al alloy coated layer. Si is also an element that contributes to higher electrical resistivity of the ferritic stainless steel sheet as with Al, and Si contained in the Al or Al alloy coated layer is diffused into the coating substrate by a predetermined heat treatment as with Al. If the Si content in the Al or Al alloy coated layer is more than 15.0 mass %, however, columnar Si precipitates into the Al or Al alloy coated layer, as a result of which the exfoliation resistance and the workability decrease. The Si content in the Al—Si alloy coating (molten bath) is therefore preferably 15.0 mass % or less. No lower limit is placed on the Si content in the Al—Si alloy coating (molten bath), but the lower limit is preferably 1.0 mass %.

Examples of the inevitable impurities in each of the Al coating (molten bath) and the Al—Si alloy coating (molten bath) include B, Be, Mg, Ca, Sr, Ti, Mn, Co, Ni, Cu, Zn, Sn, Pb, As, Sb, Bi, La, and Ce. The total content of the inevitable impurities is preferably 1 mass % or less.

The chemical composition of the Al or Al alloy coated layer does not necessarily coincide with the chemical composition of the Al coating (molten bath) or the Al—Si alloy coating (molten bath).

In detail, the Al or Al alloy coated layer contains coating substrate components incorporated into the molten bath as a result of reaction between the molten bath and the coating substrate during the coating treatment, inevitable impurities in the molten bath, and the like. Examples of the coating substrate components incorporated into the Al or Al alloy coated layer include Fe and Cr. In the case of the Al—Si alloy coating (molten bath), Si is also incorporated into the Al or Al alloy coated layer.

For example, in one embodiment, in the case of forming the Al or Al alloy coated layer in the foregoing Al coating (molten bath) or Al—Si alloy coating (molten bath) using the foregoing coating substrate by the below-described coating treatment method, the Al or Al alloy coated layer is made up of 80 mass % or more Al and 20 mass % or less in total the balance (for example, Si, Fe, Cr, and/or inevitable impurities). The total amount of the inevitable impurities (components other than Al, Si, Fe, and Cr) contained in the Al or Al alloy coated layer is preferably 1 mass % or less.

In order to sufficiently diffuse Al contained in the Al or Al alloy coated layer into the coating substrate by the below-described heat treatment (diffusion heat treatment), it is important that the thickness and Al content of the coating substrate and the thickness of the Al or Al alloy coated layer satisfy the relationship in the following expression (1):

$$8.0 \leq C_{Al} + 30 \times t/T \leq 20.0 \quad (1)$$

where $C_{Al}$ is the Al content of the coating substrate (mass %), T is the thickness of the coating substrate (μm), and t is the thickness of the Al or Al alloy coated layer (in the case where the Al or Al alloy coated layer is present on each of both sides of the coating substrate, the total thickness of the Al or Al alloy coated layers on both sides of the coating substrate) (μm).

That is, the ferritic stainless steel sheet according to one of the disclosed embodiments has a feature that, as a result of performing a diffusion heat treatment on an Al or Al alloy coated stainless steel sheet including, as a coating substrate, a ferritic stainless steel sheet having a predetermined chemical composition, specifically, a chemical composition containing Al in a range of 2.5 mass % to 6.5 mass % and at least one selected from the group consisting of Zr and Hf in an appropriate amount, Al is diffused into the coating substrate to increase the Al content to 8.0 mass % or more.

We produced Al or Al alloy coated stainless steel sheets that vary in the thickness and Al content of the coating substrate and vary in the thickness of the Al or Al alloy coated layer using various Al coatings or Al—Si alloy coatings, and studied the amount of Al increased as a result of the diffusion heat treatment. We consequently found out that the amount of Al increased as a result of the diffusion heat treatment can be predicted by 30×t/T, using the thickness of the coating substrate and the thickness of the Al or Al alloy coated layer.

Hence, from the viewpoint of controlling the Al content in the ferritic stainless steel sheet as the finished product to the appropriate range, the thickness and Al content of the coating substrate and the thickness of the Al or Al alloy coated layer in the Al or Al alloy coated stainless steel sheet satisfy the relationship in the foregoing expression (1). The value of $C_{Al} + 30 \times t/T$ is preferably 9.0 or more. The value of $C_{Al} + 30 \times t/T$ is preferably 15.0 or less.

The thickness of the Al or Al alloy coated layer is measured by cross-sectional observation using a scanning electron microscope (SEM).

In detail, for each of nine test pieces cut from the Al or Al alloy coated stainless steel sheet, its cross-section in the rolling direction is mirror polished, and observed using the SEM with 1000 magnification. The distance from the interface between the Al or Al alloy coated layer and the coating substrate to the surface of the Al or Al alloy coated layer is measured throughout the length of the test piece in the rolling direction at intervals of 1 mm, as the thickness of the coated layer per one side. In the case where the Al or Al alloy coated layer is provided on both sides of the coating substrate, this measurement is performed on both sides of the Al or Al alloy coated stainless steel sheet, and the total thickness of the Al or Al alloy coated layers on both sides of the coating substrate is calculated. The (arithmetic) mean value of these measurement values is taken to be the thickness of the Al or Al alloy coated layer.

In the Al or Al alloy coated stainless steel sheet, the Al or Al alloy coated layer may be provided only on one side of the coating substrate or provided on both sides of the coating substrate.

A preferred method of producing the ferritic stainless steel sheet according to one of the disclosed embodiments will be described below.

The ferritic stainless steel sheet according to one of the disclosed embodiments is produced by subjecting the foregoing Al or Al alloy coated stainless steel sheet to a heat treatment (diffusion heat treatment) of holding in a temperature range of 600° C. to 1300° C. for 1 minute or more to diffuse Al contained in the Al or Al alloy coated layer into the coating substrate of the Al or Al alloy coated stainless steel sheet and increase the Al content in the coating substrate to 8.0% or more.

From the viewpoint of homogenizing Al diffused, it is preferable to hold the Al or Al alloy coated stainless steel sheet in a temperature range of 900° C. to 1200° C. for 10 minutes or more. No upper limit is placed on the holding time, but the holding time is preferably 120 minutes or less from the viewpoint of productivity and the like.

The atmosphere in the heat treatment may be air, but it is preferable to perform the heat treatment in a vacuum of $1 \times 10^{-1}$ Pa or less, or a non-oxidizing atmosphere such as an inert atmosphere of Ar or the like, a $N_2$ atmosphere, or a mixed atmosphere of $H_2$ and $N_2$, in order to reduce the consumption of Al by oxidation.

Before the heat treatment, the Al or Al alloy coated stainless steel sheet produced as described below may be subjected to additional rolling to reduce the thickness. Particularly in the case of producing a thin ferritic stainless steel sheet, since the efficiency of the coating treatment decreases if rolling is performed to the final thickness in the coating substrate stage, it is preferable to perform additional rolling after the coating treatment. Even in the case of performing such additional rolling, the amount of Al increased as a result of the diffusion heat treatment can be predicted by 30×t/T, where T is the thickness of the coating substrate before the rolling and t is the thickness of the Al or Al alloy coated layer before the rolling.

The heat treatment may be performed before working the steel sheet into the finished part, or after working the steel sheet into a predetermined shape such as a resistance heating element.

For example, in the case where high-temperature brazing treatment is performed in the production process of the member such as a resistance heating element or the use temperature of the member exceeds 900° C., such heating may be substituted for the heat treatment (diffusion heat treatment). In this case, the Al or Al alloy coated stainless steel sheet produced as described below may be subjected to another heat treatment. For example, in the case of performing the additional rolling, the other heat treatment is preferably performed before the additional rolling. In the case of working the steel sheet into the predetermined shape without the additional rolling, the other heat treatment is preferably performed before the working. The other heat treatment is a heat treatment not satisfying the conditions that the steel sheet is held in a temperature range of 600° C. to 1300° C. for 1 minute or more (for example, a heat treatment of holding in a temperature range of 300° C. or more and less than 600° C. for 1 second to 10 minutes, or a heat treatment of holding in a temperature range of 600° C. to 1300° C. for 1 second or more and less than 1 minute).

The Al or Al alloy coated stainless steel sheet can be produced, for example, in the following manner:

Molten steel having the foregoing chemical composition (the chemical composition of the coating substrate of the Al or Al alloy coated stainless steel sheet) is prepared by steelmaking through a commonly known method such as using a converter, an electric furnace, or a vacuum melting furnace, and is subjected to continuous casting or ingot casting and blooming to obtain a slab.

The slab is then rolled to obtain a ferritic stainless steel sheet as a coating substrate.

The rolling method is not limited, and a conventional method may be used. Examples include a method of subjecting the slab to hot rolling to obtain a hot-rolled steel sheet and subjecting the hot-rolled steel sheet to cold rolling and cold-rolled sheet annealing, and a method of subjecting the slab to hot rolling to obtain a hot-rolled steel sheet, subjecting the hot-rolled steel sheet to hot-rolled sheet annealing and then to cold rolling. Hot-rolled sheet annealing and cold-rolled sheet annealing are optional processes, and only one or both of the processes may be performed or none of the processes may be performed. The conditions of hot rolling, hot-rolled sheet annealing, cold rolling, and cold-rolled sheet annealing are not limited, and may be in accordance with conventional methods.

For example, the slab is heated at 1100° C. to 1250° C. for 1 hour to 24 hours, and then subjected to hot rolling to obtain a hot-rolled steel sheet with a thickness of approximately 2.0 mm to 6.0 mm. After this, the hot-rolled steel sheet is optionally subjected to descaling by pickling or mechanical polishing, and further subjected to cold rolling and cold-rolled sheet annealing, to obtain a ferritic stainless steel sheet as a coating substrate.

The ferritic stainless steel sheet as the coating substrate is then subjected to Al or Al alloy coating, to yield an Al or Al alloy coated stainless steel sheet. The coating method is not limited, and may be, for example, a method of production using a typical continuous hot dip coating line. Sendzimir process, flux process, pre coating process, or the like may be used.

The temperature of the molten bath of the Al or Al alloy coating (hereafter also referred to as "bath temperature") is preferably in a range of (solidification start temperature+20° C.) to 750° C.

Here, the preferable lower limit of the bath temperature is set to (solidification start temperature+20° C.), in order to prevent local solidification of coating components caused by a local bath temperature decrease of the molten bath. If the bath temperature is more than 750° C., rapid cooling of the coating adhering to the coating substrate surface is difficult, leading to poor appearance called sagging. The preferred upper limit of the bath temperature is therefore set to 750° C.

The immersion time in the molten bath is preferably 0.5 seconds or more, from the viewpoint of forming a sufficient amount of coated layer on the surface of the coating substrate.

As the molten bath, the foregoing Al coating or Al—Si alloy coating may be used. The thickness of the Al or Al alloy coated layer may be adjusted, for example, by $N_2$ gas wiping.

The conditions of pretreatments such as degreasing are not limited, and may be in accordance with conventional methods.

The temperature of the coating substrate (sheet temperature) when entering the molten bath is not limited. However, in the case of using a continuous hot dip coating line, the temperature of the coating substrate is preferably within ±20° C. of the temperature of the molten bath, from the viewpoint of ensuring coating properties and preventing a change in bath temperature in operation.

The conditions of heating the coating substrate before immersion into the molten bath are not limited, but it is preferable to use a reducing gas atmosphere such as a mixed atmosphere of $H_2$ and $N_2$ with a dew point of −15° C. or less, in order to suppress the formation of an $Al_2O_3$ layer during heating as much as possible.

Examples

Slabs having the chemical compositions shown in Table 1 (the balance consisting of Fe and inevitable impurities) were each prepared by steelmaking using a 50 kg small vacuum melting furnace. The slabs were each heated to 1200° C., and then subjected to hot rolling in a temperature range of 900° C. to 1200° C. to obtain a hot-rolled steel sheet with a thickness of 2.0 mm. For steel ID "O" in Table 1, cracking occurred in hot rolling, and therefore the subsequent evaluation was not performed. The obtained hot-rolled steel sheet was then subjected to hot-rolled sheet annealing at 900° C. for 1 minute in air. After surface scale was removed by pickling, the hot-rolled steel sheet was subjected to cold rolling to obtain a cold-rolled steel sheet (ferritic stainless steel sheet) with the thickness T shown in Table 2. Some cold-rolled steel sheets (steel sheets subjected to additional rolling after the below-described coating treatment) were further subjected to cold-rolled sheet annealing of holding at 900° C. for 20 seconds in a mixed atmosphere of $H_2$ and $N_2$ ($H_2:N_2$=75:25 in volume ratio).

Using the resultant cold-rolled steel sheet as a coating substrate, a coating treatment was performed by hot dip coating to obtain an Al or Al alloy coated stainless steel sheet.

Specifically, a steel sheet with a length (rolling direction) of 170 mm and a width of 70 mm cut from the foregoing cold-rolled steel sheet was used as a coating substrate. The coating substrate was heated, and held at 700° C. for 20 seconds in a mixed atmosphere of $H_2$ and $N_2$ ($H_2:N_2$=90:10 in volume ratio, dew point: −30° C.). Immediately afterward, the coating substrate was subjected to a hot dip coating treatment of immersing in an Al molten bath of 700° C. or in an Al-8 mass % Si molten bath of 660° C. for 5 seconds, to obtain an Al or Al alloy coated stainless steel sheet.

The coating area in the coating substrate was an area with a length (rolling direction) of 100 mm and a width of 70 mm. The thickness of the Al or Al alloy coated layer was adjusted by $N_2$ gas wiping.

The thickness of the Al or Al alloy coated layer in the resultant Al or Al alloy coated stainless steel sheet was measured in the following manner:

The coating area (length: 100 mm, width: 70 mm) of the Al or Al alloy coated stainless steel sheet was cut out, and an area of 10 mm was cut off from each edge, thus obtaining a test piece with a length of 80 mm and a width of 50 mm. The test piece was divided into thirds in the length direction and divided into thirds in the width direction, and a small piece with a length of 15 mm and a width of 10 mm was cut from the center part of each divided test piece, thus obtaining nine test pieces for cross-sectional observation.

Each test piece for cross-sectional observation was then buried in resin so as to expose a cross-section in the length direction (rolling direction), and the cross-section in the length direction was mirror polished. Cross-sectional observation was performed using a scanning electron microscope (SEM) with 1000 magnification, and the thickness of the coated layer per one side (the distance from the interface between the Al or Al alloy coated layer and the coating substrate to the surface of the Al or Al alloy coated layer) was measured throughout the length of the test piece for cross-sectional observation in the rolling direction at intervals of 1 mm. This measurement was performed on both sides of the test piece for cross-sectional observation, and the total thickness of the Al or Al alloy coated layers was calculated. The arithmetic mean value of the calculated thicknesses of the test pieces was taken to be the thickness of the Al or Al alloy coated layer. The measured thickness of the Al or Al alloy coated layer in the Al or Al alloy coated stainless steel sheet is shown in Table 2.

Each obtained Al or Al alloy coated stainless steel sheet was subjected to a heat treatment (diffusion heat treatment), thus obtaining a ferritic stainless steel sheet as a finished product (hereafter the term "ferritic stainless steel sheet" denotes a "ferritic stainless steel sheet as a finished product" unless otherwise stated).

The heat treatment was conducted by holding the steel sheet at 1100° C. for 30 minutes in a vacuum of $1\times10^{-1}$ Pa or less and allowing furnace cooling.

For some Al or Al alloy coated stainless steel sheets, before the heat treatment (diffusion heat treatment), additional cold rolling was performed to obtain the thickness shown in Table 2 (in the case of not performing additional rolling, the field "Thickness of Al or Al alloy coated stainless steel sheet after additional rolling" in Table 2 indicates the total thickness of the Al or Al alloy coated stainless steel sheet (the thickness of the coating substrate+the thickness of the Al or Al alloy coated layer)).

The chemical composition of the resultant ferritic stainless steel sheet was measured by collecting chips from part of the ferritic stainless steel sheet and performing wet analysis. The measurement results are shown in Table 3. The balance consists of Fe and inevitable impurities.

Moreover, the obtained ferritic stainless steel sheet and Al or Al alloy coated stainless steel sheet were used to evaluate (1) coatability, (2) deformation caused by heat treatment, (3) workability, (4) electrical resistivity, and (5) oxidation resistance. The evaluation results are shown in Table 4.

(1) Coatability

The coating area (length: 100 mm, width: 70 mm) of the Al or Al alloy coated stainless steel sheet (in the case of performing additional rolling, the Al or Al alloy coated stainless steel sheet before the additional rolling) was cut out, and an area of 10 mm was cut off from each edge, thus producing a test piece with a length of 80 mm and a width of 50 mm. Five such test pieces were produced according to the same procedure.

The surface (coated surface) of each test piece was photographed, and the non-coating part in the photograph was colored while visually comparing it with the test piece. The photograph was then used to determine the area ratio (=[the area of the non-coating part $(mm^2)$]/[the area of the coating area of the test piece $(mm^2)$]×100) of the non-coating part (colored area) by image processing.

In the case where the mean area ratio of the non-coating parts of the five test pieces was less than 1%, the sample was evaluated as good. In the case where the mean area ratio was 1% or more, the sample was evaluated as poor.

(2) Deformation in Heat Treatment

The deformation (deformation by warpage or distortion) in the heat treatment was evaluated as follows:

Three test pieces with a length (rolling direction) of 30 mm and a width of 10 mm were cut from the Al or Al alloy coated stainless steel sheet before the heat treatment (in the case of performing additional rolling, the Al or Al alloy coated stainless steel sheet after the additional rolling), and these test pieces were subjected to a heat treatment (holding at 1100° C. for 30 minutes in a vacuum of $1.0\times10^{-1}$ Pa or less and then allowing furnace cooling) simulating the diffusion heat treatment.

The length of each test piece after the heat treatment at the center in the width direction was then measured, and the amount of shape change was calculated according to the following expression:

[the amount of shape change (%)]=([the length of the test piece after the heat treatment (mm)]−[the length of the test piece before the heat treatment (mm)])/[the length of the test piece before the heat treatment (mm)]×100.

The (arithmetic) mean value of the amounts of shape change of the three test pieces was then calculated. In the case where the amount of shape change was within ±5%, the sample was evaluated as good. In the case where the amount of shape change was beyond ±5%, the sample was evaluated as poor.

(3) Workability

The workability was evaluated by subjecting the foregoing ferritic stainless steel sheet to corrugation typically performed on metal heating elements used in exhaust gas purifiers of vehicles.

The ferritic stainless steel sheet (length: 80 mm, width: 50 mm) was corrugated by passing the steel sheet between two gear-type rolls with a maximum bending radius of 0.5 mm, a wave pitch of 2.0 mm, and a wave height of 2.0 mm. In the case where the ferritic stainless steel sheet was able to be worked with no fracture or cracking, the ferritic stainless steel sheet was evaluated as good. In the case where a fracture or cracking occurred, the ferritic stainless steel sheet was evaluated as poor.

(4) Electrical Resistivity

The electrical resistivity was measured by the four-terminal method defined in JIS C 2525.

Five test pieces of 10 mm×80 mm were cut from the foregoing ferritic stainless steel sheet, and the volume resistivity of each test piece was measured. Their mean value was taken to be the volume resistivity of the ferritic stainless steel sheet, which was evaluated based on the following criteria:

excellent: volume resistivity of more than 170 μΩ·cm
good: volume resistivity of more than 142 μΩ·cm and 170 μΩ·cm or less
poor: volume resistivity of 142 μΩ·cm or less.

(5) Oxidation Resistance

The oxidation resistance was evaluated by an oxidation test of holding in high-temperature air. Two test pieces with a width of 20 mm and a length (rolling direction) of 30 mm were collected from the foregoing ferritic stainless steel sheet, and subjected to a treatment of oxidizing in an air atmosphere at 1100° C. for 400 hours. The mass gain by oxidation between before and after the treatment (the value obtained by dividing the amount of mass change of the test piece between before and after the oxidation treatment by the surface area of the test piece before the oxidation treatment) was measured. The mean value of the mass gains by oxidation of the test pieces was taken to be the mass gain by oxidation of the ferritic stainless steel sheet, which was evaluated based on the following criteria:

excellent: mass gain by oxidation of 8.0 $g/m^2$ or less
good: mass gain by oxidation of more than 8.0 $g/m^2$ and 12.0 $g/m^2$ or less
poor: mass gain by oxidation of more than 12.0 $g/m^2$, or occurrence of layer exfoliation.

TABLE 1

| Steel ID | Chemical composition of coating substrate (mass %) | | | | | | | | | | | | Remarks |
|---|---|---|---|---|---|---|---|---|---|---|---|---|---|
| | C | Si | Mn | P | S | Cr | Al | Ni | N | Zr | Hf | Others | |
| A | 0.005 | 0.15 | 0.10 | 0.024 | 0.001 | 20.5 | 5.7 | 0.14 | 0.005 | 0.03 | — | — | Conforming steel |
| B | 0.006 | 0.14 | 0.11 | 0.023 | 0.001 | 20.2 | 5.8 | 0.15 | 0.005 | 0.03 | — | La: 0.091 | Conforming steel |
| C | 0.005 | 0.13 | 0.11 | 0.024 | 0.001 | 18.0 | 3.4 | 0.16 | 0.005 | 0.04 | — | La: 0.085 | Conforming steel |
| D | 0.026 | 0.19 | 0.13 | 0.020 | 0.001 | 20.2 | 5.8 | 0.12 | 0.006 | 0.05 | 0.05 | Y: 0.039 | Conforming steel |
| E | 0.005 | 0.15 | 0.11 | 0.023 | 0.001 | 20.0 | 5.7 | 0.15 | 0.006 | 0.03 | — | La: 0.085, Mo: 3.1 | Conforming steel |
| F | 0.008 | 0.21 | 0.13 | 0.024 | 0.002 | 11.5 | 5.4 | 0.21 | 0.018 | — | 0.08 | Mo: 0.5, W: 0.6 | Conforming steel |
| G | 0.012 | 0.28 | 0.12 | 0.026 | 0.002 | 13.8 | 6.3 | 0.15 | 0.007 | — | 0.12 | Ti: 0.25, Cu: 0.05 | Conforming steel |
| H | 0.008 | 0.92 | 0.51 | 0.023 | 0.001 | 11.3 | 3.1 | 0.16 | 0.008 | 0.03 | 0.12 | V: 0.11, Ca: 0.0019, Mg: 0.0015 | Conforming steel |
| I | 0.008 | 0.13 | 0.15 | 0.024 | 0.002 | 20.5 | 2.7 | 0.46 | 0.006 | 0.04 | — | La: 0.033, Ce: 0.056, Nb: 0.20 | Conforming steel |
| J | 0.006 | 0.16 | 0.15 | 0.026 | 0.001 | 29.7 | 3.2 | 0.16 | 0.005 | 0.16 | — | B: 0.0035, Ca: 0.0019, Mg: 0.0015 | Conforming steel |
| K | 0.006 | 0.86 | 0.15 | 0.025 | 0.001 | 20.1 | 5.1 | 0.16 | 0.006 | 0.15 | — | La: 0.086, Cu: 0.08 | Conforming steel |
| L | 0.015 | 0.15 | 0.32 | 0.025 | 0.001 | 16.9 | 0.02 | 0.18 | 0.017 | — | — | — | Comparative steel |
| M | 0.008 | 0.18 | 0.16 | 0.024 | 0.002 | 20.1 | 2.1 | 0.16 | 0.005 | — | — | — | Comparative steel |
| N | 0.005 | 0.13 | 0.15 | 0.023 | 0.002 | 20.1 | 5.6 | 0.18 | 0.006 | — | — | — | Comparative steel |
| O | 0.005 | 0.16 | 0.11 | 0.025 | 0.001 | 20.0 | 7.5 | 0.15 | 0.005 | 0.03 | — | La: 0.079 | Comparative steel |

TABLE 2

| No | Steel ID | Al or Al alloy coated stainless steel sheet | | | | | Additional rolling after coating treatment | Thickness of Al or Al alloy coated stainless steel sheet after additional rolling (μm) | Remarks |
|---|---|---|---|---|---|---|---|---|---|
| | | Molten bath composition | Coating substrate Thickness: T (μm) | Al content: $C_{Al}$ (mass %) | Thickness of Al or Al alloy coated layer: t (μm) | $C_{Al} + 30 \times t/T$ | | | |
| 1 | A | Al | 50 | 5.7 | 15 | 14.7 | Not performed | 65 | Example |
| 2 | A | Al | 300 | 5.7 | 50 | 10.7 | Performed | 50 | Example |
| 3 | A | Al | 100 | 5.7 | 70 | 26.7 | Performed | 50 | Comparative Example |
| 4 | A | Al | 1000 | 5.7 | 29 | 6.6 | Performed | 50 | Comparative Example |
| 5 | A | Al—8%Si | 300 | 5.7 | 102 | 15.9 | Performed | 50 | Example |
| 6 | A | Al—8%Si | 1000 | 5.7 | 179 | 11.1 | Performed | 200 | Example |
| 7 | A | Al—8%Si | 100 | 5.7 | 65 | 25.2 | Performed | 50 | Comparative Example |
| 8 | A | Al—8%Si | 1000 | 5.7 | 34 | 6.7 | Performed | 50 | Comparative Example |
| 9 | B | Al | 50 | 5.8 | 13 | 13.6 | Not performed | 63 | Example |
| 10 | B | Al | 300 | 5.8 | 42 | 10.0 | Performed | 50 | Example |
| 11 | B | Al—8%Si | 300 | 5.8 | 98 | 15.6 | Performed | 50 | Example |
| 12 | B | Al—8%Si | 1000 | 5.8 | 165 | 10.8 | Performed | 200 | Example |
| 13 | B | Al—8%Si | 100 | 5.8 | 63 | 24.7 | Performed | 50 | Comparative Example |
| 14 | C | Al | 100 | 3.4 | 35 | 13.9 | Performed | 50 | Example |
| 15 | C | Al | 300 | 3.4 | 25 | 5.9 | Performed | 50 | Comparative Example |
| 16 | D | Al—8%Si | 300 | 5.8 | 108 | 16.6 | Performed | 50 | Example |
| 17 | E | Al | 300 | 5.7 | 85 | 14.2 | Performed | 50 | Example |
| 18 | F | Al | 500 | 5.4 | 98 | 11.3 | Performed | 100 | Example |

TABLE 2-continued

| | | Al or Al alloy coated stainless steel sheet | | | | | Thickness of | |
|---|---|---|---|---|---|---|---|---|
| No | Steel ID | Molten bath composition | Coating substrate Thickness: T (μm) | Thickness of Al or Al alloy Al content: $C_{Al}$ (mass %) | Thickness of Al or Al alloy coated layer: t (μm) | $C_{Al} + 30 \times t/T$ | Additional rolling after coating treatment | Al or Al alloy coated stainless steel sheet after additional rolling (μm) | Remarks |
| 19 | G | Al | 300 | 6.3 | 74 | 13.7 | Performed | 50 | Example |
| 20 | H | Al | 50 | 3.1 | 15 | 12.1 | Not performed | 65 | Example |
| 21 | I | Al—8%Si | 300 | 2.7 | 84 | 11.1 | Performed | 100 | Example |
| 22 | J | Al—8%Si | 300 | 3.2 | 78 | 11.0 | Performed | 50 | Example |
| 23 | K | Al | 300 | 5.1 | 87 | 13.8 | Performed | 50 | Example |
| 24 | L | Al—8%Si | 300 | 0.02 | 77 | 7.7 | Performed | 50 | Comparative Example |
| 25 | M | Al—8%Si | 300 | 2.1 | 67 | 8.8 | Performed | 50 | Comparative Example |
| 26 | N | Al—8%Si | 300 | 5.6 | 48 | 10.4 | Performed | 50 | Comparative Example |
| 27 | O | Not evaluated because cracking occurred in hot rolling | | | | | | | Comparative Example |

TABLE 3

| | | Ferritic stainless steel sheet Chemical composition (mass %) | | | | | | | | | | | | |
|---|---|---|---|---|---|---|---|---|---|---|---|---|---|---|
| No. | Steel ID | C | Si | Mn | P | S | Cr | Al | Ni | N | Zr | Hf | Others | Remarks |
| 1 | A | 0.005 | 0.14 | 0.10 | 0.023 | 0.001 | 20.3 | 14.7 | 0.13 | 0.005 | 0.03 | — | — | Example |
| 2 | A | 0.005 | 0.14 | 0.09 | 0.024 | 0.001 | 20.1 | 10.7 | 0.14 | 0.005 | 0.03 | — | — | Example |
| 3 | A | 0.004 | 0.14 | 0.09 | 0.023 | 0.001 | 20.2 | 25.8 | 0.14 | 0.005 | 0.03 | — | — | Comparative Example |
| 4 | A | 0.005 | 0.15 | 0.09 | 0.023 | 0.001 | 20.2 | 6.4 | 0.14 | 0.005 | 0.02 | — | — | Comparative Example |
| 5 | A | 0.004 | 0.95 | 0.08 | 0.022 | 0.001 | 20.2 | 14.8 | 0.13 | 0.005 | 0.02 | — | — | Example |
| 6 | A | 0.004 | 0.51 | 0.08 | 0.023 | 0.001 | 19.9 | 10.8 | 0.12 | 0.005 | 0.02 | — | — | Example |
| 7 | A | 0.004 | 1.82 | 0.09 | 0.023 | 0.001 | 20.1 | 24.1 | 0.12 | 0.005 | 0.02 | — | — | Comparative Example |
| 8 | A | 0.004 | 0.21 | 0.09 | 0.023 | 0.001 | 20.2 | 6.1 | 0.13 | 0.005 | 0.03 | — | — | Comparative Example |
| 9 | B | 0.006 | 0.14 | 0.09 | 0.023 | 0.001 | 19.8 | 14.1 | 0.15 | 0.005 | 0.03 | — | La: 0.087 | Example |
| 10 | B | 0.005 | 0.13 | 0.10 | 0.022 | 0.001 | 19.9 | 9.2 | 0.15 | 0.005 | 0.03 | — | La: 0.085 | Example |
| 11 | B | 0.005 | 0.91 | 0.09 | 0.021 | 0.001 | 19.8 | 14.1 | 0.15 | 0.005 | 0.03 | — | La: 0.089 | Example |
| 12 | B | 0.005 | 0.51 | 0.08 | 0.021 | 0.001 | 19.5 | 9.5 | 0.15 | 0.005 | 0.02 | — | La: 0.081 | Example |
| 13 | B | 0.006 | 1.71 | 0.09 | 0.023 | 0.001 | 19.8 | 24.8 | 0.15 | 0.005 | 0.03 | — | La: 0.083 | Comparative Example |
| 14 | C | 0.005 | 0.12 | 0.10 | 0.023 | 0.001 | 17.5 | 14.3 | 0.16 | 0.005 | 0.03 | — | La: 0.081 | Example |
| 15 | C | 0.005 | 0.12 | 0.10 | 0.024 | 0.001 | 17.8 | 5.2 | 0.16 | 0.005 | 0.04 | — | La: 0.079 | Comparative Example |
| 16 | D | 0.026 | 1.21 | 0.12 | 0.019 | 0.001 | 20.0 | 15.1 | 0.12 | 0.006 | 0.04 | 0.04 | Y: 0.031 | Example |
| 17 | E | 0.006 | 0.15 | 0.10 | 0.021 | 0.001 | 19.8 | 13.4 | 0.15 | 0.006 | 0.03 | — | La: 0.079, Mo: 3.0 | Example |
| 18 | F | 0.008 | 0.19 | 0.13 | 0.023 | 0.001 | 11.3 | 10.6 | 0.21 | 0.018 | — | 0.07 | Mo: 0.4, W: 0.4 | Example |
| 19 | G | 0.010 | 0.26 | 0.11 | 0.026 | 0.002 | 13.5 | 12.8 | 0.15 | 0.007 | — | 0.12 | Ti: 0.24, Cu: 0.05 | Example |
| 20 | H | 0.007 | 0.89 | 0.48 | 0.023 | 0.001 | 11.1 | 12.8 | 0.16 | 0.008 | 0.03 | 0.11 | V: 0.11, Ca: 0.0014, Mg: 0.0011 | Example |
| 21 | I | 0.008 | 0.73 | 0.14 | 0.023 | 0.001 | 20.1 | 11.2 | 0.46 | 0.006 | 0.03 | — | La: 0.029, Ce: 0.048, Nb: 0.19 | Example |
| 22 | J | 0.005 | 0.71 | 0.14 | 0.025 | 0.001 | 29.4 | 10.9 | 0.16 | 0.005 | 0.15 | — | B: 0.0031, Ca: 0.0015, Mg: 0.0011 | Example |
| 23 | K | 0.006 | 0.85 | 0.15 | 0.024 | 0.001 | 19.8 | 12.7 | 0.16 | 0.006 | 0.14 | — | La: 0.081, Cu: 0.07 | Example |
| 24 | L | 0.013 | 0.89 | 0.31 | 0.024 | 0.001 | 16.4 | 7.6 | 0.18 | 0.017 | — | — | — | Comparative Example |
| 25 | M | 0.008 | 0.75 | 0.15 | 0.023 | 0.002 | 19.5 | 8.4 | 0.16 | 0.005 | — | — | — | Comparative Example |
| 26 | N | 0.005 | 0.49 | 0.14 | 0.023 | 0.001 | 19.8 | 11.0 | 0.18 | 0.006 | — | — | — | Comparative Example |
| 27 | O | Not evaluated because cracking occurred in hot rolling | | | | | | | | | | | | Comparative Example |

TABLE 4

| | Evaluation results | | | | | | | |
|---|---|---|---|---|---|---|---|---|
| No. | (1) Coatability | (2) Deformation in heat treatment | (3) Workability | (4) Electrical resistivity Volume resistivity (μΩ·cm) | Evaluation | (5) Oxidation resistance Mass gain by oxidation (g/m²) | Evaluation | Remarks |
| 1 | Good | Good | Good | 225 | Excellent | 8.1 | Good | Example |
| 2 | Good | Good | Good | 181 | Excellent | 8.3 | Good | Example |
| 3 | Good | Good | Poor | Evaluation omitted | | | | Comparative Example |
| 4 | Good | Good | Good | 131 | Poor | 9.3 | Good | Comparative Example |
| 5 | Good | Good | Good | 226 | Excellent | 9.2 | Good | Example |
| 6 | Good | Good | Good | 195 | Excellent | 8.6 | Good | Example |

TABLE 4-continued

| | | | | Evaluation results | | | | |
|---|---|---|---|---|---|---|---|---|
| | | (2) | | (4) Electrical resistivity | | (5) Oxidation resistance | | |
| No. | (1) Coatability | Deformation in heat treatment | (3) Workability | Volume resistivity (μΩ·cm) | Evaluation | Mass gain by oxidation (g/m²) | Evaluation | Remarks |
| 7 | Good | Good | Poor | Evaluation omitted | | | | Comparative Example |
| 8 | Good | Good | Good | 131 | Poor | 9.3 | Good | Comparative Example |
| 9 | Good | Good | Good | 205 | Excellent | 5.9 | Excellent | Example |
| 10 | Good | Good | Good | 161 | Good | 5.8 | Excellent | Example |
| 11 | Good | Good | Good | 215 | Excellent | 5.7 | Excellent | Example |
| 12 | Good | Good | Good | 175 | Excellent | 6.1 | Excellent | Example |
| 13 | Good | Good | Poor | Evaluation omitted | | | | Comparative Example |
| 14 | Good | Good | Good | 189 | Excellent | 6.2 | Excellent | Example |
| 15 | Good | Good | Good | 125 | Poor | 11.3 | Good | Comparative Example |
| 16 | Good | Good | Good | 228 | Excellent | 5.8 | Excellent | Example |
| 17 | Good | Good | Good | 205 | Excellent | 6.3 | Excellent | Example |
| 18 | Good | Good | Good | 159 | Good | 10.6 | Good | Example |
| 19 | Good | Good | Good | 172 | Excellent | 10.1 | Good | Example |
| 20 | Good | Good | Good | 182 | Excellent | 11.5 | Good | Example |
| 21 | Good | Good | Good | 179 | Excellent | 7.2 | Excellent | Example |
| 22 | Good | Good | Good | 206 | Excellent | 9.6 | Good | Example |
| 23 | Good | Good | Good | 215 | Excellent | 7.1 | Excellent | Example |
| 24 | Good | Poor | Good | 142 | Poor | 14.3 | Poor | Comparative Example |
| 25 | Poor | Poor | Good | 172 | Excellent | 10.9 | Good | Comparative Example |
| 26 | Poor | Poor | Good | 180 | Excellent | 13.1 | Poor | Comparative Example |
| 27 | Not evaluated because cracking occurred in hot rolling | | | | | | | Comparative Example |

As can be understood from Table 4, all Examples had good coatability, had little deformation due to heat treatment, and had superior workability, electrical resistivity, and oxidation resistance.

In all Comparative Examples, on the other hand, cracking occurred in hot rolling and test pieces could not be produced, or at least one of coatability, deformation in heat treatment, workability, electrical resistivity, and oxidation resistance was not satisfactory.

In No. 3, No. 7, and No. 13, workability was insufficient, and accordingly the evaluation of (4) electrical resistivity and (5) oxidation resistance was omitted.

The invention claimed is:

1. A method of producing a ferritic stainless steel sheet comprising a chemical composition containing, in mass %,
C: 0.030% or less,
Si: 3.0% or less,
Mn: 1.0% or less,
P: 0.040% or less,
S: 0.010% or less,
Cr: 11.0% to 30.0%,
Al: 10.7% to 20.0%,
Ni: 0.05% to 0.50%,
N: 0.020% or less, and
at least one selected from the group consisting of Zr: 0.01% to 0.20% and Hf: 0.01% to 0.20%,
with a balance being Fe and inevitable impurities, the method comprising
subjecting an Al or Al alloy coated stainless steel sheet comprising:
a coating substrate; and
an Al or Al alloy coated layer on a surface of the coating substrate,
wherein the coating substrate is a ferritic stainless steel sheet having a chemical composition containing, in mass %,
C: 0.030% or less,
Si: 1.0% or less,
Mn: 1.0% or less,
P: 0.040% or less,
S: 0.010% or less,
Cr: 11.0% to 30.0%,
Al: 2.5% to 6.5%,
Ni: 0.05% to 0.50%,
N: 0.020% or less, and
at least one selected from the group consisting of Zr: 0.01% to 0.20% and Hf: 0.01% to 0.20%,
with a balance being Fe and inevitable impurities, and
a thickness and an Al content of the coating substrate and a thickness of the Al or Al alloy coated layer satisfy a relationship in the following expression (1):

$$8.0 \leq C_{Al} + 30 \times t/T \leq 20.0 \qquad (1)$$

where $C_{Al}$ is the Al content of the coating substrate in mass %, T is the thickness of the coating substrate in μm, and t is the thickness of the Al or Al alloy coated layer in μm, and, in the case where the Al or Al alloy coated layer is present on each of both sides of the coating substrate, is a total thickness of Al or Al alloy coated layers on the both sides of the coating substrate, to a heat treatment of holding in a temperature range of 600° C. to 1300° C. for 1 minute or more and 120 minutes or less in a vacuum of $1 \times 10^{-1}$ Pa or less or a non-oxidizing atmosphere, and
wherein the number of times the heat treatment is performed is 1.

2. The method according to claim 1, wherein the holding time in the heat treatment is 1 minute or more and 30 minutes or less.

3. The method according to claim 2, wherein an Al content of a chemical composition of a produced ferritic stainless steel sheet is 11.2% to 20.0%.

4. The method according to claim 1, wherein an Al content of a chemical composition of a produced ferritic stainless steel sheet is 11.2% to 20.0%.

5. A method of producing a ferritic stainless steel sheet comprising a chemical composition containing, in mass %, C: 0.030% or less,
Si: 3.0% or less,
Mn: 1.0% or less,
P: 0.040% or less,
S: 0.010% or less,
Cr: 11.0% to 30.0%,
Al: 10.7% to 20.0%,
Ni: 0.05% to 0.50%,
N: 0.020% or less, and
at least one selected from the group consisting of Zr: 0.01% to 0.20% and Hf: 0.01% to 0.20%, and
one or more selected from the group consisting of
REM: 0.01% to 0.20%,
Cu: 0.01% to 0.10%,
Ti: 0.01% to 0.50%,
Nb: 0.01% to 0.50%,
V: 0.01% to 0.50%,
Mo: 0.01% to 6.0%,
W: 0.01% to 6.0%,
B: 0.0001% to 0.0050%,
Ca: 0.0002% to 0.0100%, and
Mg: 0.0002% to 0.0100%,
with a balance being Fe and inevitable impurities, the method comprising subjecting an Al or Al alloy coated stainless steel sheet comprising:
a coating substrate; and
an Al or Al alloy coated layer on a surface of the coating substrate,
wherein the coating substrate is a ferritic stainless steel sheet having a chemical composition containing, in mass %,
C: 0.030% or less,
Si: 1.0% or less,
Mn: 1.0% or less,
P: 0.040% or less,
S: 0.010% or less,
Cr: 11.0% to 30.0%,
Al: 2.5% to 6.5%,
Ni: 0.05% to 0.50%,
N: 0.020% or less,
at least one selected from the group consisting of Zr: 0.01% to 0.20% and Hf: 0.01% to 0.20%, and
one or more selected from the group consisting of
REM: 0.01% to 0.20%,
Cu: 0.01% to 0.10%,
Ti: 0.01% to 0.50%,
Nb: 0.01% to 0.50%,
V: 0.01% to 0.50%,
Mo: 0.01% to 6.0%,
W: 0.01% to 6.0%,
B: 0.0001% to 0.0050%,
Ca: 0.0002% to 0.0100%, and
Mg: 0.0002% to 0.0100%,
with a balance being Fe and inevitable impurities, and
a thickness and an Al content of the coating substrate and a thickness of the Al or Al alloy coated layer satisfy a relationship in the following expression (1):

$$8.0 \leq C_{Al} + 30 \times t/T \leq 20.0 \tag{1}$$

where $C_{Al}$ is the Al content of the coating substrate in mass %, T is the thickness of the coating substrate in μm, and t is the thickness of the Al or Al alloy coated layer in μm, and, in the case where the Al or Al alloy coated layer is present on each of both sides of the coating substrate, is a total thickness of Al or Al alloy coated layers on the both sides of the coating substrate, to a heat treatment of holding in a temperature range of 600° C. to 1300° C. for 1 minute or more and 120 minutes or less in a vacuum of $1 \times 10^{-1}$ Pa or less or a non-oxidizing atmosphere, and
wherein the number of times the heat treatment is performed is 1.

6. The method according to claim 5, wherein the holding time in the heat treatment is 1 minute or more and 30 minutes or less.

7. The method according to claim 6, wherein an Al content of a chemical composition of a produced ferritic stainless steel sheet is 11.2% to 20.0%.

8. The method according to claim 5, wherein an Al content of a chemical composition of a produced ferritic stainless steel sheet is 11.2% to 20.0%.

* * * * *